United States Patent Office 2,977,344
Patented Mar. 28, 1961

2,977,344

BUTYL RUBBER CURED IN THE PRESENCE OF A COMBINATION OF ACCELERATORS

Kenneth W. Powers, Metuchen, Samuel B. Robison, Roselle, and James V. Fusco, Westfield, N.J., assignors to Esso Research and Engineering Company, a corporation of Delaware No Drawing. Filed Sept. 6, 1957, Ser. No. 682,309

9 Claims. (Cl. 260—79.5)

The present invention relates to an improved process for curing low unsaturation synthetic polymers as well as the cured polymers obtained by the process. More specifically, it relates to curing butyl rubber in the presence of sulfur or a sulfur donor with a combination of accelerators comprising dithiocarbamates and disulfides.

Butyl rubber which is a low unsaturation copolymer of an isoolefin and a multiolefin is unique in that because it has a low unsaturation it is generally slower curing than the more highly unsaturated rubbers such as natural rubber and butadiene-styrene rubber. Moreover, curing systems that increase the cure rate generally have a deleterious effect on the other properties of the butyl, principally its flexibility and tendency to scorch. These latter deficiencies make it difficult to process the butyl or use it in articles that are subjected to flexing actions.

The present invention overcomes these difficulties by employing a critical combination of accelerators which not only substantially increases the cure rate of butyl but also maintains and even improves its scorchiness and flexibility. A combination of accelerators comprising certain dithiocarbamates and disulfides coact to produce a butyl vulcanizate which is highly acceptable for use in such things as automobile tires and curing bladders.

The expression "butyl rubber" as employed in the specification and claims is intended to include copolymers made from a polymerization reactant mixture having about 70–99.5% by weight of an isoolefin which has about 4–7 carbon atoms, and about 30–0.5% by weight of a conjugated multiolefin having about 4–14 carbon atoms. The resulting copolymer contains 85 to 99.5% of combined isoolefin and 0.5 to 15% of combined multiolefin. The term "butyl rubber" is described in an article by R. M. Thomas et al. in Industrial Engineering and Chemistry, vol. 32, pages 1283 et seq., October 1940.

In preparing butyl rubber polymer, the isoolefin and multiolefin are mixed in the ratio of a major proportion of the isoolefin, the preferred range being about 70 to 99.5, preferably 85 to 99.5 parts by weight of the issolefin to about 30 to 0.5, preferably 0.5 to 15 parts by weight of the multiolefin. High purity is desirable in both materials, it being preferable to use an isoolefin of at least 98% purity, although satisfactory copolymers may be made from multiolefins of a lower purity.

In general, the rubber comprises the reaction product of a $C_4$ to $C_7$ isoolefin, such as isobutylene or 2-methyl-1-butene, with a $C_4$ to $C_{10}$ conjugated diolefin, such as isoprene, butadiene or piperylene. The reaction product of isobutylene and isoprene is preferred. For instance, 96.6 to 97.5% by weight of isobutylene is reacted with 2.5 to 3.4% by weight of isoprene.

The mixture of monomers is cooled to a temperature within the range between about 0° and −200° C., preferably between about −40° and −160° C. It is especially preferred that the reaction temperature be between −60° C. and −130° C. The materials may be cooled by the use of a refrigerating jacket, which surrounds the mixing tank, for instance using liquefied ethylene as cooling liquid. Alternatively, the mixture may be cooled by means of an internal refrigerant. In this case, it is mixed directly with the starting materials. Refrigerants which have been found to be satisfactory for internal use are liquid propane, solid carbon dioxide, liquid ethane, liquid ethylene, etc.

The cold mixture is polymerized by the addition of a Friedel-Craft's catalyst, preferably an aluminum halide catalyst in a liquid or dissolved form, with vigorous agitation. The amount of catalyst employed is generally about 0.15% to about 1.0% by weight of the mixed olefins. The liquid catalyst may be sprayed on to the surface of the rapidly stirred mixture, or it may be introduced in the form of a pressured stream.

The polymerization reaction proceeds rapidly. The polymer precipitates out of solution in the form of a slurry of flocculent white solid. When the polymerization has reached the desired stage, the material is conveniently recovered by charging the whole mixture into warm water which may contain alcohol, ether, aldehyde or organic acid to inactivate the catalyst. The polymer is then recovered from the water suspension in any convenient manner, such as straining or filtering. It is then dried either by passing it through a tunnel drier, or on a mill. The product has plastic and elastic properties.

The polymer has a Staudinger molecular weight between approximately 20,000 to 150,000. It is desired that the molecular weight fall between about 35,000 and 100,000 and it is preferred that it be in the range between 45,000 and 60,000. The material has a Wijs iodine number between about 0.5 and 50, generally between about 1 and 15. The prepartion of the above rubbery butyl copolymer is described in U.S. Patent No. 2,356,128 to which reference may be had for further details.

In accordance with the invention, butyl rubber is compounded with sulfur or a sulfur-containing substance such as morpholine disulfide and a combination of dithiocarbamate and disulfide accelerators prior to curing it at, say, 250 to 400° F. or up to a temperature at which the butyl is adversely affected. The essence of the discovery is that when specific salts of dithiocarbamic acid derivatives are employed together with certain arylthiazyl disulfides and thiuram disulfides in critical quantites, butyl rubber can be cured at a substantially increased rate while remaining processible.

The thiocarbamates coming within the purview of the invention have the following general formula:

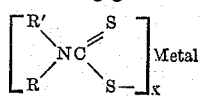

wherein R is an alkyl group having 1 to 4 carbon atoms and preferably 1 to 2 carbon atoms; R′ is an alkyl, aryl, alkaryl or cycloparaffin group having 1 to 10 carbon atoms and preferably an alkyl group having 1 to 4 carbon atoms; X is the valence of the metal and can be 2 to 4; the metal may be selected from those elements in groups I–B, II–B, IV–A, V–A and VI–A of the Periodic Chart of the Elements as published on pages 56 and 57 of the "Handbook of Chemistry" by Lange, 8th Edition, 1952, and preferably is divalent copper or tetravalent tellurium. Moreover, the dithiocarbamate salts may consist of different derivatives, that is to say, copper dimethyl dithiocarbamate may be combined with tellurium diethyl dithiocarbamate. Other dithiocarbamates that are suitable for the purposes of the invention include selenium diethyl dithiocarbamate, selenium dimethyl dithiocarbamate, copper diethyl dithiocarbamate, tellurium dimethyl dithiocarbamate, tellurium ethyl benzyl dithiocarbamate, zinc dimethyl dithiocarbamate, etc. For best results, the thiocarbamate portion of the accelerator mixture should comprise either the tellurium salt alone or a combination of this salt and the copper salt. However, it is advisable not to use more than 0.75 part by weight of the copper salt for each part by weight of the tellurium salt.

The disulfide portion of the accelerator mixture consists of two components, namely, an arylthiazyl disulfide, preferably benzothiazyl disulfide, and a thiuram disulfide, preferably a tetraalkyl thiuram disulfide such as tetramethyl thiuram disulfide. Examples of other disulfides are tetraethyl thiuram disulfide and diethyl dibenzyl thiuram disulfide.

The ratio of the various constituents in the accelerator combination is critical. For instance if too much thiazyl disulfide is used, it will retard the cure, while if an excess of dithiocarbamate is employed, the product will be very scorchy. For these as well as other reasons, it is necessary to carefully adjust the quantity of each accelerator employed. It has been found that in order to obtain the desirable vulcanizates described herein, the amount of arylthiazyl disulfide added to the butyl should be between 0.25 and 1.25 parts by weight, preferably 0.4 to 0.8 part by weight, per part by weight of total dithiocarbamate. The amount of thiuram disulfide should be between 0.1 and 2 parts by weight, preferably 0.75 and 1.25 parts by weight, per each part by weight of total dithiocarbamate. By total dithiocarbamate is meant the combined weight where two or more different derivatives or salts are employed, i.e., copper and tellurium salts. The copper salt should be present in an amount between 0.25 and 0.75 part, preferably about 0.5 part, for each part of tellurium salt. The total amount of accelerator should be about 0.5 to 8 parts by weight per 100 parts by weight of polymer (p.h.p.), although for most purposes it may vary from 2 to 5 parts. The total amount of thiocarbamate should be about 0.117 to 5.93 p.h.p. (parts by weight per hundred parts of polymer.)

The butyl and accelerators may be compounded according to any of the conventional techniques, for instance in a Banbury mixer or other mixing device. Moreover, other components usually found in rubber, such as carbon black, mineral fillers, dyes, extender oils, plasticizers, etc. may also be compounded with the butyl according to the particular requirements.

If desired, before adding the sulfur-containing curing agent and accelerator combination, the butyl may be heat interacted with 20 to 100 p.h.p. of a filler, such as clay or carbon black, e.g. channel black, either in the presence or absence, of 0.1 to 1% based on the butyl of a promoter such as p-dinitrosobenzene, p-quinone dioxime, sulfur, N,4-dinitroso-N-methyl aniline, or other nitroso or sulfur containing substances. This heat treatment may be either static, dynamic, as in a Banbury mixer or on heated steel rolls, or a combination cyclic treatment such as by 2 to 10 or 15 repeated cycles of static heating for 10 minutes to an hour, followed by mixing for 1 to 3 or 5 minutes. The heat treatment should generally be carried out at a temperature of about 250 to 500° F., preferably about 300 to 450° F., inversely for a period of time ranging from about 5 or 10 minutes up to 8 hours. A preferred heat treatment is mixing in a Banbury at about 300 to 400° F. for about 5 to 15 minutes or, in the case of static heating, about 1 to 4 hours at about 300 to 350° F.

The curing agent, which is generally sulfur or a sulfur-containing substance which donates sulfur, may be present in an amount which may be as little as one part or as high as 5 parts by weight or more if necessary. The limitations here are mainly economical and any quantity may be used that does not have an undesired effect. In most instances it is advantageous to have a metal oxide present, say, 3 to 10 parts by weight of a divalent metal oxide like zinc oxide.

Because the accelerators shorten the curing time, the compounded butyl will reach its optimum cure state in approximately 5 to 40 minutes depending upon the temperature; however, at temperatures of 300–320° F. the cure time will be about 10 to 30 minutes, and on the average about 20 minutes. It will have a Mooney scorch at 260° F. of from 12 to 24 minutes (5 point rise).

One of the principal advantages of the invention is that it makes possible a butyl carcass that cures rapidly enough to obtain a low vulcanized tread having good abrasion properties. Furthermore, the carcass will have excellent flexing properties and will not be too scorchy to process. Aside from tire carcasses it may be used in hoses, conveyor belts and curing bladders.

The following examples are given in order that there will be a better understanding of the invention and its various embodiments.

EXAMPLE 1

Isobutylene-isoprene butyl rubber (GRI–25) having a mole percent unsaturation of 2.1–2.5 was compounded according to the following recipe and heat interacted at 350° F. in a Banbury employing a 10-minute cycle:

| Ingredient: | Parts by weight |
|---|---|
| Butyl | 100 |
| SAF black | 30 |
| FT black | 20 |
| N,4-dinitroso-N-methyl aniline | 0.7 |
| Zinc oxide | 5 |
| Amberol ST–137X [1] | 5 |

[1] A phenol-formaldehyde resin prepared in the presence of an acid catalyst, sold by Rohm & Haas.

The heat-interacted butyl rubber was then compounded as follows and cured at 307° F.:

| Ingredient: | P.h.p. |
|---|---|
| Sulfur | 2 |
| Tellurium diethyl dithiocarbamate | 1 |
| Benzothiazyl disulfide | 1 |
| Tetramethylthiuram disulfide | 1 |
| Phenyl beta-naphthylamine | 1 |

The following table contains the data obtained when samples of the compounded polymer were cured for varying periods of time:

Table I

| Cure Time, Min. | 15 | 30 | 60 |
|---|---|---|---|
| Physical properties @ R.T: | | | |
| Modulus @ 300% elongation, p.s.i. | 1,600 | 2,100 | 2,300 |
| Tensile @ break, p.s.i. | 2,470 | 2,400 | 2,310 |
| Elongation @ break, percent | 455 | 350 | 310 |
| Shore A hardness | 53 | 56 | 58 |
| Tear strength, lbs./in. | 145 | 110 | 80 |
| Goodrich Flexometer Performance @ 100° C., Stroke 0.25 in., 1,800 r.p.m., load 89 p.s.i. and 30-min. test duration: | | | |
| Percent permanent set | 13.6 | 7.7 | 4.2 |
| Percent dynamic compression | 7.4 | 4.7 | 3.4 |
| Temperature rise, ° C | 19 | 16 | 18 |
| Appearance | very good | excellent | excellent |

The results show that a 15 minute cure is sufficient with this accelerator combination. The Mooney scorch of the butyl at 260° F. was such that it required 15 minutes to attain a 5 point rise. When the same master batch was cured in the same way with 1 p.h.p. of benzothiazole disulfide, 1.35 p.h.p. of tellurium diethyldithiocarbamate and 2 p.h.p. of sulfur, it required 30 minutes of curing to obtain a modulus at 300% elongation equal to that obtained after only 15 minutes with this novel accelerator combination. Thus, the cure rate may be approximately doubled by merely employing a critical combination of accelerators. The flexometer results which were not as good at the 15-minute cure time as they were for the longer cures may be improved by employing a mixture of dithiocarbamates. This is shown in the following example.

EXAMPLE 2

The same procedure and recipes described in Example 1 were repeated except 0.5 p.h.p. of copper dimethyl dithiocarbamate and 0.5 p.h.p. of benzothiazyldisulfide were substituted for 1 p.h.p. of the latter in the original recipe. The samples were cured at 307° F. and evaluated as before:

*Table II*

| Cure Time, Min. | 15 | 30 | 60 |
|---|---|---|---|
| Physical Properties @ R.T.: | | | |
| Modulus @ 300% elongation, p.s.i. | 1,860 | 2,200 | |
| Tensile @ break, p.s.i. | 2,380 | 2,350 | 2,250 |
| Elongation @ break, percent | 400 | 320 | 295 |
| Shore A Hardness | 53 | 56 | 58 |
| Tear Strength, lbs./in. | 165 | 90 | 90 |
| Goodrich Flexometer Performance @ 100° C., Stroke 0.25 in., 1,800 r.p.m., load 89 p.s.i. and 30-min. test duration: | | | |
| Percent permanent set | 11.6 | 7.0 | 3.3 |
| Percent dynamic compression | 6.4 | 4.4 | 1.3 |
| Temperature rise, ° C | 19 | 16 | 18 |
| Appearance | excellent | excellent | excellent |

The copper salt increased the modulus at 300% and substantially improved the flexometer results. The compounded butyl had a Mooney scorch of more than 13 minutes (5-point rise). Thus it is best to use a combination of copper and tellurium dithiocarbamates where high cure rates and excellent flexing properties are desirable.

EXAMPLE 3

A series of expriments was carried out to determine the eff ct of employing different amounts of dithiocarbamate and disulfide. A master batch was prepared with isobutylene-isoprene butyl rubber (GR-I-15) having a viscosity average molecular weight 320,000 and an unsaturation of 1.6-1.7 mole percent according to the following formulation:

| Ingredient: | Parts by weight |
|---|---|
| Butyl | 100 |
| MPC carbon black | 40 |
| Stearic acid | 1 |
| N,4-dinitroso-N-methyl aniline | 0.9 |
| ZnO | 5 |

The batch was heat treated in the manner described in Example 1, and samples were compounded with 2 parts per hundred of polymer of sulfur and the following accelerators prior to curing them at 307° F. for 20 minutes.

*Table III*

| | Parts by Weight | | |
|---|---|---|---|
| | 1 | 2 | 3 |
| Master Batch | 148.9 | 148.9 | 148.9 |
| Accelerator: | | | |
| Te diethyl dithiocarbamate | 1.0 | 1 | 1 |
| Cu dimethyl dithiocarbamate | | 0.5 | 0.5 |
| Benzothiazyldisulfide | 1.0 | 0.5 | 1.0 |
| Tetramethyl thiuram disulfide | | 1.0 | 1.0 |
| Tensile Prop. @ R.T.: | | | |
| Modulus @ 300%, p.s.i. | 1,120 | 1,700 | 1,750 |
| Tensile strength, p.s.i. | 2,800 | 2,550 | 2,650 |
| Elongation, percent | 565 | 415 | 405 |
| Shore A hardness | 45 | 50 | 50 |
| Goodrich Flexometer Test—Load 89 p.s.i.; Stroke 0.25 in.; Oven 100° C.; 1,800 r.p.m. and 30-min test: | | | |
| Permanent set, percent | 33.9 | 17.5 | 17.4 |
| Dynamic drift, percent | 15.6 | 8.4 | 10.1 |
| Temperature rise, ° C | 28 | 18 | 19 |
| Appearance | Very porous | Excellent | Excellent |
| Mooney scorch @ 260° F., small rotor, min. to 5 pt. rise | 20 | 18 | 19 |

The data show that without the thiuram disulfide and copper dithiocarbamate the flexing properties are inferior to those obtained when these substances are present in the required amounts. The processing safety of all of the compounded butyl is approximately the same. Furthermore, it is important to note that as the thiazyldisulfide approaches a 1:1 weight ratio with the dithiocarbamate the flexing properties are adversely affected (column 1). The relationship among these accelerators is critical and should be given careful consideration when compounding with butyl rubber.

The foregoing examples, while given to assist in comprehending the various embodiments of the invention, are not to be considered as limiting the discovery. Various equivalents may be substituted in the recipes, such as channel black or clay for furnace black. Furthermore, the compounded butyl may be heat treated or treated in the conventional manner, depending on the properties desired in the vulcanizate.

In the appended claims, the expression "butyl rubber" is intended to mean a rubbery copolymer of about 85–99.5% by wt. of an isoolefin of 4–7 carbon atoms, and about 15–0.5% of a conjugated multiolefin having about 4–14 carbon atoms.

What is cla:med is:

1. Process for increasing the cure rate of isobutylene-isoprene butyl rubber, a copolymer of 85 to 99.5 wt. percent isobutylene and 15 to 0.5 wt. percent isoprene, which comprises compounding 100 parts by weight of butyl rubber with about 1 to 3 parts by weight of sulfur and about 0.5 to 8 parts by weight of an accelerator ccmbination cons sting essentially of about 0.117 to 5.93 parts of a mixture of tellurium dialkyl dithiocarbamate and copper dialkyl dithiocarbamate, per 100 parts of butyl rubber, about 0.25 to 1 part by weight of benzothiazyldisulfide, 0.1 to 2 parts by weight of tetramethylthiuram disulfide per part of total th.ocarbamates, and 0.25 to 0.75 part of copper dialkyl dithiocarbamate for each part by weight of tellurium dialkyl dithiocarbamate, both said dialkyl dithiocarbamates being composed of two $C_1$ to $C_4$ alkyl groups, and heating the compounded butyl rubber at 250 to 400° F. unt.l it is cured.

2. Process according to claim 1 in which the dialkyl groups contain 1 to 4 carbon atoms.

3. A flexible vulcanizate comprising 100 parts by weight of an isobutylene-isoprene butyl rubber, a copolymer of 85 to 99.5 wt. percent isobutylene and 15 to 0.5 wt. percent isoprene, having an iodine number of about 1 to 15, cured with about 1 to 3 parts by weight of sulfur and 0.5 to 8 parts by weight of an accelerator combination consisting essentially of about 1 part of tellurium diethyldithiocarbamate, about 0 to 0.5 parts of copper dimethyldithiocarbamate, about 0.5 to 1 part of benzothiazyldisulfide, and about 1 part of tetramethylthiuram disulfide per hundred parts by weight of butyl rubber.

4. A fast-curing vulcanizable composition comprising 100 parts by weight of a copolymer of 85 to 99.5 wt. percent of a $C_4$ to $C_7$ isoolefin and 0.5 to 15 wt. percent of a $C_4$ to $C_{14}$ multiolefin compounded with 1 to 5 parts by weight of sulfur and about 0.5 to 8 parts by weight of an accelerator combination consisting essentially of 0.117 to 5.93 parts by weight of a di-$C_1$ to $C_4$ alkyl dithiocarbamate of a metal selected from the group consisting of tellurium and copper, and about 0.25 to 1.25 parts by weight of benzyl thiazyl disulfide per part of total dithiocarbamate, and about 0.1 to 2 parts by weight of tetramethyl thiuram disulfide per part of total dithiocarbamate.

5. The composition of claim 4 wherein said dithiocarbamate is tellurium diethyl dithiocarbamate.

6. The composition of claim 4 wherein said dithiocarbamate is copper dimethyl dithiocarbamate.

7. The composition of claim 4 which contains both tellurium diethyl dithiocarbamate and copper dimethyl dithiocarbamate.

8. The process of claim 1 wherein said tellurium dialkyl dithiocarbamate is tellurium diethyl dithiocarbamate, and said copper dialkyl dithiocarbamate is copper dimethyl dithiocarbamate.

9. A process for increasing the cure rate of a butyl rubber copolymer of 85 to 99.5 wt. percent of a $C_4$ to $C_7$ isoolefin and 0.5 to 15 wt. percent of a $C_4$ to $C_{14}$ multiolefin which comprises compounding 100 parts by weight of said copolymer with about 1 to 3 parts by weight of sulfur and about 0.5 to 8 parts by weight of an accelerator combination consisting essentially of 0.117 to 5.93 parts by weight of a member of the group consisting of tellurium diethyl dithiocarbamate and copper dimethyl dithiocarbamate, per 100 parts of butyl rubber copolymer, about 0.25 to 1.25 parts by weight of benzyl thiazyl disulfide per part of total dithiocarbamate, and 0.1 to 2 parts by weight of tetramethyl dithiuram disulfide per part of total dithiocarbamate, and adding the compounded butyl rubber copolymer at 250 to 400° F. until it is cured.

References Cited in the file of this patent

UNITED STATES PATENTS 2,775,537  Wilson et al. _____ Dec. 25, 1956

OTHER REFERENCES

Whitby: "Synthetic Rubber" (1954), Wiley & Sons, N.Y., page 884.